US011002333B2

(12) United States Patent
Schneider et al.

(10) Patent No.: US 11,002,333 B2
(45) Date of Patent: May 11, 2021

(54) FREQUENCY-SELECTIVE VIBRATION DAMPER FOR MOTOR VEHICLES WITH A BYPASS CONTROL VALVE

(71) Applicants: THYSSENKRUPP BILSTEIN GMBH, Ennepetal (DE); thyssenkrupp AG, Essen (DE)

(72) Inventors: Juergen Schneider, Iserlohn (DE); Klaus Schmidt, Odenthal (DE); Ole Goetz, Braunschweig (DE)

(73) Assignees: thyssenkrupp Bilstein GmbH, Ennepetal (DE); thyssenkrupp AG, Essen (DE)

( * ) Notice: Subject to any disclaimer, the term of this patent is extended or adjusted under 35 U.S.C. 154(b) by 118 days.

(21) Appl. No.: 16/099,338

(22) PCT Filed: May 16, 2017

(86) PCT No.: PCT/EP2017/061711
§ 371 (c)(1),
(2) Date: Nov. 6, 2018

(87) PCT Pub. No.: WO2017/202647
PCT Pub. Date: Nov. 30, 2017

(65) Prior Publication Data
US 2019/0211897 A1 Jul. 11, 2019

(30) Foreign Application Priority Data
May 23, 2016 (DE) ...................... 10 2016 208 845.9

(51) Int. Cl.
*F16F 9/512* (2006.01)
*F16F 9/348* (2006.01)
(Continued)

(52) U.S. Cl.
CPC .............. *F16F 9/3481* (2013.01); *F16F 9/19* (2013.01); *F16F 9/3214* (2013.01);
(Continued)

(58) Field of Classification Search
CPC ........... F16F 9/504; F16F 9/512; F16F 9/5126
See application file for complete search history.

(56) References Cited

U.S. PATENT DOCUMENTS

2005/0045440 A1* 3/2005 Kock ...................... F16F 9/512
188/322.15
2014/0048365 A1* 2/2014 Kim ......................... F16F 9/34
188/322.13
(Continued)

FOREIGN PATENT DOCUMENTS

CN 104343879 A 2/2015
CN 104565176 A 4/2015
(Continued)

OTHER PUBLICATIONS

English Translation of International Search Report issued in PCT/EP2017/061711, dated Sep. 8, 2017 (dated Sep. 25, 2017).

*Primary Examiner* — Bradley T King
(74) *Attorney, Agent, or Firm* — thyssenkrupp North America, LLC

(57) ABSTRACT

The present invention relates to a vibration damper (1) comprising
a damper tube (2) which is at least partially filled with damping fluid and in which a piston rod (3) is movable back and forth, wherein a working piston (4) is movable jointly with the piston rod (3), by means of which working piston the interior space of the damper tube is divided into a piston-rod-side working space (5) and a piston-rod-remote working space (6),
(Continued)

a damping module (7) for the frequency-dependent control of a comfort bypass which is formed between the piston-rod-side working space (5) and the piston-rod-remote working space (6) and which comprises a comfort path via which damping fluid can be caused to flow hydraulically in parallel with respect to the flow through the working piston (4), a control piston (8) which is received, such that it can perform stroke movements, in the damping module (7) and which, remote from the piston rod, delimits a pressure chamber (9) arranged in the damping module (7), wherein the pressure chamber (9) comprises at least one inlet (10), wherein the damping module (7) comprises a damping module housing, with a housing cover (11) arranged at the piston rod side and with a housing pot (12) arranged remote from the piston rod, comprises the control piston (8) and comprises at least one first disk valve assembly (13), wherein the at least one first disk valve assembly (13), in the comfort path with the housing cover (11), forms a comfort valve, and the at least one first disk valve assembly (13) comprises at least one bypass control valve with at least one bypass inlet opening (16), wherein, via the at least one bypass control valve, bypassing the comfort valve, damping fluid can be caused to flow via a bypass control path hydraulically in parallel with respect to the flow through the working piston (4), wherein the bypass control valve is controlled by means of the stroke of the control piston (8) and wherein the disk valve assembly (13) comprises at least one bypass disk (17) with at least one bypass disk opening (18), comprises at least one spacer disk (19) and comprises a comfort disk (20).

8 Claims, 3 Drawing Sheets

(51) Int. Cl.
 *F16F 9/19* (2006.01)
 *F16F 9/32* (2006.01)
(52) U.S. Cl.
 CPC .......... *F16F 9/3488* (2013.01); *F16F 9/5126* (2013.01); *F16F 2228/04* (2013.01)

(56) References Cited

U.S. PATENT DOCUMENTS

| | | |
|---|---|---|
| 2014/0238798 A1* | 8/2014 | De Kock ................ F16F 9/465 188/317 |
| 2015/0053518 A1 | 2/2015 | Nowaczyk |
| 2015/0152936 A1* | 6/2015 | Kim ..................... F16F 9/3485 188/313 |
| 2015/0247546 A1* | 9/2015 | Nowaczyk ............. F16F 9/512 188/313 |
| 2015/0276005 A1 | 10/2015 | Kim |
| 2016/0025181 A1* | 1/2016 | Nowaczyk ................ F16F 9/50 188/315 |
| 2016/0047432 A1 | 2/2016 | Nowaczyk |
| 2018/0135720 A1* | 5/2018 | De Kock ................. F16F 9/34 |
| 2018/0156301 A1* | 6/2018 | De Kock ................. F16F 9/19 |
| 2019/0003550 A1* | 1/2019 | Yan ........................ F16F 9/512 |
| 2019/0219127 A1* | 7/2019 | Schneider ............. F16F 9/5126 |
| 2019/0249744 A1* | 8/2019 | Forster .................... B62K 25/00 |
| 2019/0293146 A1* | 9/2019 | Patel ....................... F16F 9/185 |
| 2019/0329623 A1* | 10/2019 | Van De Plas .......... B60G 13/08 |
| 2020/0102997 A1* | 4/2020 | Van De Plas ........ B60G 17/056 |

FOREIGN PATENT DOCUMENTS

| | | |
|---|---|---|
| DE | 1455823 A | 5/1969 |
| DE | 602 10 652 T | 8/2006 |
| EP | 2175161 A | 4/2010 |
| WO | 2015/185274 A | 12/2015 |
| WO | 2015/185279 A | 12/2015 |

* cited by examiner

FREQUENCY-SELECTIVE VIBRATION DAMPER FOR MOTOR VEHICLES WITH A BYPASS CONTROL VALVE

CROSS REFERENCE TO RELATED APPLICATIONS

This application is a U.S. National Stage Entry of International Patent Application Serial Number PCT/EP2017/061711, filed May 16, 2017, which claims priority to German Patent Application No. DE 10 2016 208 845.9, filed May 23, 2016, the entire contents of both of which are incorporated herein by reference.

FIELD

The present disclosure generally relates a frequency-selective vibration damper for motor vehicles having a bypass control valve.

BACKGROUND

Vibration dampers are known in the prior art in a large number of embodiments.

DE 602 10 652 T2 has disclosed a shock-absorbing damper with a piston section. In the piston section, a valve body is arranged, such that it can perform stroke movements, between a comfort valve disk and a diaphragm also referred to as a valve body. For the fluidic connection of two working spaces in the damper tube, a main path, a comfort path and a bypass path are mentioned, wherein the bypass path is fixedly defined and does not provide any bypass control. The control of a bypass in particular by means of a valve disk assembly, which simultaneously comprises a comfort valve for a comfort path and a bypass control valve for bypass control, is not known. Furthermore, it is imperative for an outlet to be arranged in a pressure chamber, which outlet opens out downstream of a valve arrangement.

WO 2015/185279 describes a vibration damper with a frequency-dependent damping force characteristic curve, comprising a damping valve device with a control arrangement for a vibration damper. The control arrangement comprises a control piston, wherein the stroke of the control piston imparts a preload via a spring element to a spring washer valve in the main flow. For the fluidic connection of two working spaces in the damper tube, a main path and a separate control path are mentioned for a control path fluid flow, wherein the control path is fixedly defined by means of an outflow connection, and does not provide any control.

A problem in the case of the embodiments known from the prior art is that, at low damper speeds, the volume flow is often not sufficient to open a disk valve assembly arranged in the main flow, as a result of which all of the damping fluid flows via the bypass path. Furthermore, it is normally the case that no closed-loop control, in particular no independent closed-loop control, of the bypass flow is possible. Furthermore, embodiments known in the prior art do not have a space-saving design.

Thus a need exists for a vibration damper with short response times, in particular in the case of low-frequency excitations with small amplitudes. It is furthermore sought to permit a compact design of the improved vibration damper.

DETAILED DESCRIPTION

Figure 1:
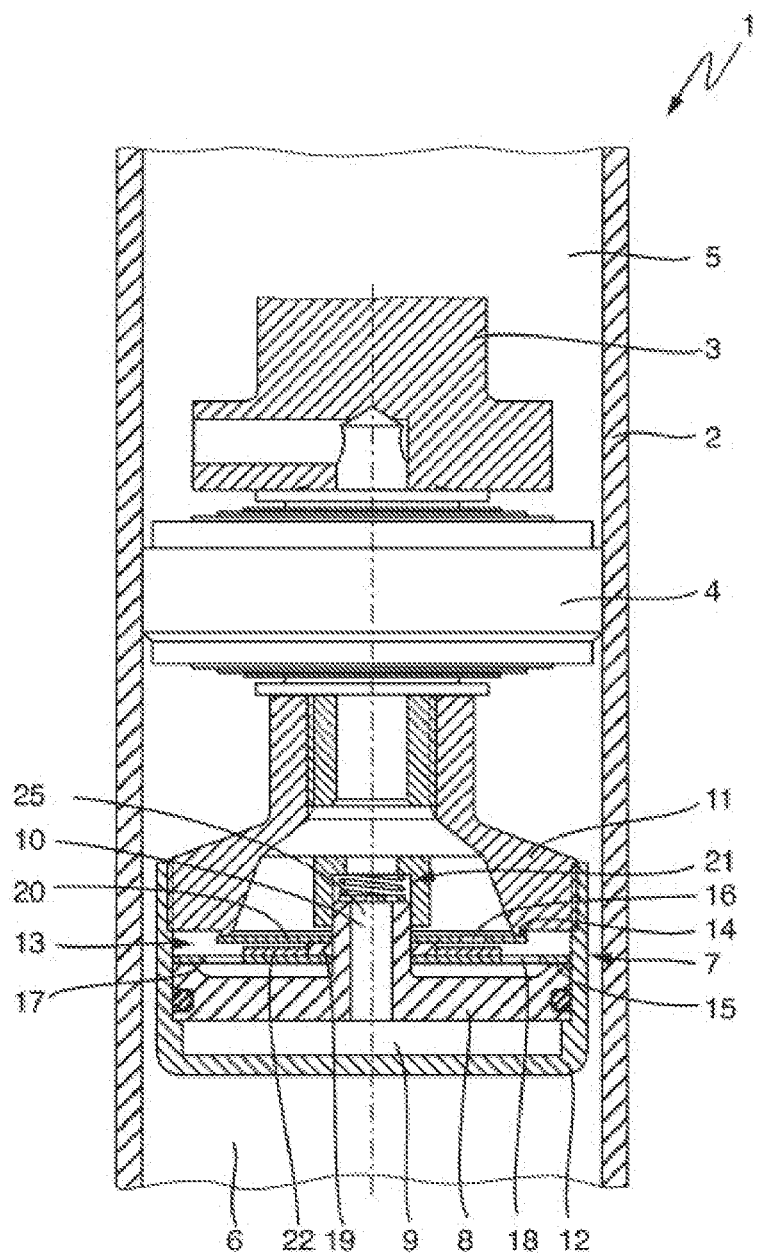
FIG. 1 is a longitudinal sectional view, in the region of a working piston and of a damping module, through a vibration damper according to an embodiment.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present invention relates to a frequency-selective vibration damper for motor vehicles having a bypass control valve.

The vibration damper according to the invention has, in relation to conventional vibration dampers, the advantage of short response times, in particular in the presence of low-frequency excitations with small amplitudes, that is to say without comfort losses or impairment in the case of other driving characteristics and/or situations.

The vibration damper according to the invention comprises
- a damper tube which is at least partially filled with damping fluid and in which a piston rod is movable back and forth, wherein a working piston is movable jointly with the piston rod, by means of which working piston the interior space of the damper tube is divided into a piston-rod-side working space and a piston-rod-remote working space,
- a damping module for the frequency-dependent control of a comfort bypass which is formed between the piston-rod-side working space (5) and the piston-rod-remote working space and which comprises a comfort path via which damping fluid can be caused to flow hydraulically in parallel with respect to the flow through the working piston (4),
- a control piston which is received, such that it can perform stroke movements, in the damping module and which, remote from the piston rod, delimits a pressure chamber arranged in the damping module, wherein the pressure chamber comprises at least one inlet, wherein the damping module comprises a damping module housing, with a housing cover arranged at the piston rod side and with a housing pot arranged remote from the piston rod, comprises the control piston and comprises at least one first disk valve assembly, wherein the at least one first disk valve assembly, in the comfort path with the housing cover, forms a comfort valve, and the at least one first disk valve assembly comprises at least one bypass control valve with at least one bypass inlet opening, wherein, via the at least one bypass control valve, bypassing the comfort valve, damping fluid can be caused to flow via a bypass control path hydraulically in parallel with respect to the flow through the working piston, wherein the bypass control valve is controlled by means of the stroke of the control piston and wherein the first disk valve assembly comprises at least one bypass disk with at least one bypass disk opening, comprises at least one spacer disk and comprises a comfort disk.

In the context of the present invention, bypassing the comfort valve is to be understood to mean a flow path which deviates from the comfort flow path, in particular between the piston-rod-side working space and the one piston-rod-remote working space.

In the context of the present invention, an inlet is to be understood to mean an opening for the throughflow of fluids, and, in particular, an inlet may be designed as a sleeve, a bore in the control piston. Depending on the flow direction, the inlet may also at the same time be configured as an outlet.

In a further preferred embodiment of the invention, the inlet is arranged such that the inlet opens into the pressure chamber in a straight line, in particular rectilinearly.

In a further embodiment of the invention, the inlet is designed such that the inlet opens into the pressure chamber coaxially with respect to the piston rod.

In a further preferred embodiment of the invention, the pressure chamber comprises an outlet, wherein the outlet is also the inlet into the pressure chamber, wherein the outlet opens, upstream, into that side of the first disk valve assembly which faces toward the piston-rod-side working space. For example, the outlet may be designed as an axially centered throughflow sleeve, arranged at the piston rod side, as a flow connection.

In a further preferred embodiment of the invention, the inlet is designed such that the inlet centers the first disk valve assembly in the damping module housing, wherein the inlet forms a guide of the first disk valve assembly.

In a further preferred embodiment of the invention, the housing cover, to form the comfort valve with the first disk valve assembly, comprises at least one comfort valve support edge as valve seat.

In a further preferred embodiment of the invention, the control piston is arranged so as to be mechanically decoupled in terms of action from the working piston.

In the context of the present invention, "decoupled in terms of action" is to be understood to mean that the control piston has no mechanically operative dependency in relation to the working piston, and, in particular, the stroke of the control piston is mechanically not dependent on the stroke of the working piston, or the control piston is decoupled in terms of force from the working piston.

In a further preferred embodiment of the invention, the control piston is arranged such that the control piston transmits a change in preload at least to the comfort valve of the first disk valve assembly.

In the context of the present invention, a change in preload is to be understood to mean a dynamic preload.

In a further preferred embodiment of the invention, the control piston comprises at least one control piston support edge arranged at the edge, wherein the first disk valve assembly lies with the side averted from the comfort valve on the at least one control piston support edge arranged at the edge. Here, the first disk valve assembly, with the side averted from the comfort valve, forms a valve seat with the at least one control piston support edge arranged at the edge.

In a further preferred embodiment of the invention, the housing pot is arranged such that the housing pot braces the first disk valve assembly relative to the housing cover and effects a defined preload at least on the comfort valve of the first disk valve assembly.

In the context of the present invention, a defined preload is to be understood to mean a static stress which is/has been set in accordance with a desired preset. For example, said static stress may be set as a preload with a screw-imparted bracing action, a clamping bracing action or a cohesive connection, in particular a welded connection.

In a further preferred embodiment of the invention, that surface of the control piston which can be subjected to pressure in the pressure chamber is larger than the surface which can be subjected to pressure at the comfort valve side in the piston-rod-side working space of the first disk valve assembly.

In a further preferred embodiment of the invention, the damping module is arranged in the rebound stage and/or the compression stage of the vibration damper.

In a further preferred embodiment of the invention, the first disk valve assembly comprises at least one bypass disk with at least one bypass disk opening, comprises at least one spacer disk and comprises a comfort disk.

In a further embodiment of the invention, the outlet is arranged on the housing pot, wherein the outlet opens into the piston-rod-remote working space.

In a further preferred embodiment of the invention, the control piston comprises at least one control piston support edge arranged at the edge, wherein the first disk valve assembly lies with the side averted from the comfort valve on the at least one control piston support edge arranged at the edge.

In a further preferred embodiment of the invention, the damping module comprises a check valve arranged at the inlet of the pressure chamber.

In the context of the present invention, a check valve is to be understood to mean an in particular spring-loaded check valve, wherein a closing element, in particular a spring washer, provides a defined small throughflow opening in one flow direction and provides a much larger throughflow opening in the other flow direction. For example, the check valve may be arranged on that side of the inlet which faces toward the piston rod and/or on that side of the inlet which is averted from the piston rod.

In a further preferred embodiment of the invention, the bypass disk, downstream on that side of the bypass disk which faces toward the piston-rod-remote working space, lies on the control piston support edge in a preloaded state, and the at least one spacer disk is geometrically designed such that the spacer disk does not cover the bypass disk opening, and the at least one spacer disk spaces the bypass disk apart from the comfort disk which is arranged upstream on the side facing toward the piston-rod-side working space.

In a further preferred embodiment of the invention, the comfort disk comprises the at least one bypass inlet opening, and the spacer disk is geometrically designed such that the spacer disk does not cover the at least one bypass inlet opening.

In a further preferred embodiment of the invention, the at least one bypass inlet opening is geometrically designed such that the bypass inlet opening, on that side of the first disk valve assembly which faces toward the inlet, runs through the first disk valve assembly from that side of the comfort disk which faces toward the piston-side working space to that side of the bypass disk which faces toward the piston-rod-remote working space.

In a further preferred embodiment of the invention, the control piston comprises the at least one bypass inlet opening and the first disk valve assembly additionally comprises a bypass spacer disk, wherein the bypass spacer disk is arranged, downstream of the bypass disk in the direction of the outer side of the first disk valve assembly, movably between the bypass disk and the control piston, and the bypass spacer disk is geometrically designed such that the bypass spacer disk covers the at least one bypass inlet opening and the at least one bypass inlet opening at least does not completely cover the bypass disk opening of the bypass disk.

In the context of the present invention, "at least does not completely cover" is to be understood to mean that it is ensured that the bypass disk opening of the bypass disk is not completely covered, and in any case a partial flow through the bypass disk opening is possible.

FIG. 1 illustrates a longitudinal section, in the region of a working piston 4 and of a damping module 7, through a vibration damper 1 having a damper tube 2, having a piston rod 3 and having the working piston 4 arranged on the piston rod 3, and of the damping module 7 according to an embodiment of the invention. The working piston 4 divides the interior space of the damper tube 2 into a piston-rod-side working space 5 and a piston-rod-remote working space 6. During a rebound or compression stage process, a main flow from the piston-rod-side working space 5 can flow through the working piston 4 in order to pass into the piston-rod-remote working space 6. A comfort flow can flow via an opening in the piston rod 3 into the damping module 7. The damping module 7 comprises a damping module housing with a housing cover 11 arranged at the piston rod side, a housing pot 12 arranged remote from the piston rod, a control piston 8, and at least one first disk valve assembly 13. The housing cover 11 comprises a comfort valve support edge 14. The control piston 8 comprises a control piston support edge 15 and is arranged such that it can perform stroke movements and so as to be remote from the piston rod, and delimits a pressure chamber 9 arranged in the damping module 7. The pressure chamber 9 comprises an inlet 10. The inlet 10 runs through the control piston 8 and is illustrated by way of example as a sleeve. In the embodiment illustrated, the inlet 10 also functions as an outlet 25. The first disk valve assembly 13 comprises a bypass disk 17 with a bypass disk opening 18, comprises a spacer disk 19 and comprises a comfort disk 20 with a bypass inlet opening 16. The spacer disk 19 is arranged between the comfort disk 20 and the bypass disk 17 and spaces the two disks apart, wherein the spacer disk 19 does not cover the bypass inlet opening 16 of the comfort disk 20 and the bypass disk opening 18 of the bypass disk 17. A bypass spacer disk 22 is arranged coaxially with respect to the spacer disk 19, wherein the bypass spacer disk 22 at least does not completely cover the bypass disk opening 18 of the bypass disk 17. The first disk valve assembly 13 is arranged in preloaded fashion between the comfort valve support edge 14 and the control piston support edge 15. The first disk valve assembly 13 is centered by means of the inlet 10 formed as a sleeve on the control piston 8. A check valve 21 may additionally be arranged in the damping module 7. The check valve 21 accelerates an evacuation of the damping chamber 9 via the outlet 25.

Figure 2:
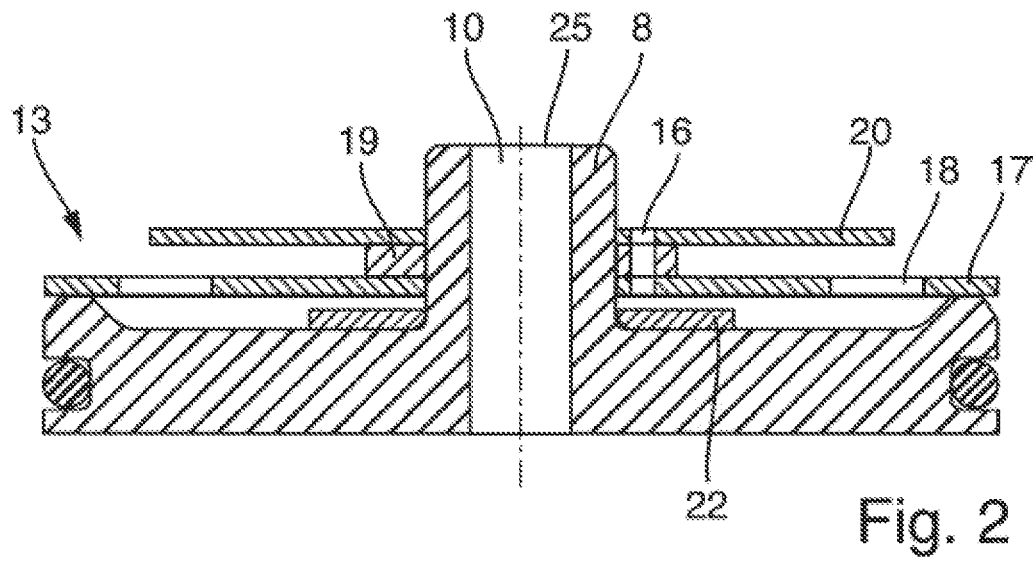
FIG. 2 is a longitudinal sectional view, in the region of a damping module, through a control piston and a first disk valve assembly according to a further embodiment of the damping module.

FIG. 2 illustrates a longitudinal section, in the region of the damping module 7, through the control piston 8 and the first disk valve assembly 13 as per a further embodiment of the damping module of the invention. By contrast to FIG. 1, in the first disk valve assembly 13 of the damping module 7, the bypass inlet opening 16 runs through the first disk valve assembly 13 from that side of the comfort disk 20 which faces toward the piston-rod-side working space to that side of the bypass disk 17 which faces toward the piston-rod-remote working space. The first disk valve assembly 13 additionally comprises a bypass spacer disk 22, wherein the bypass spacer disk 22 is arranged downstream of the bypass disk 17 in the direction of the outer side of the first disk valve assembly 13, wherein the bypass spacer disk 22 at least does not completely cover the bypass disk opening 18 of the bypass disk 17. The first disk valve assembly 13 is centered, on the side close to the piston rod, by means of the inlet 10.

Figure 3:
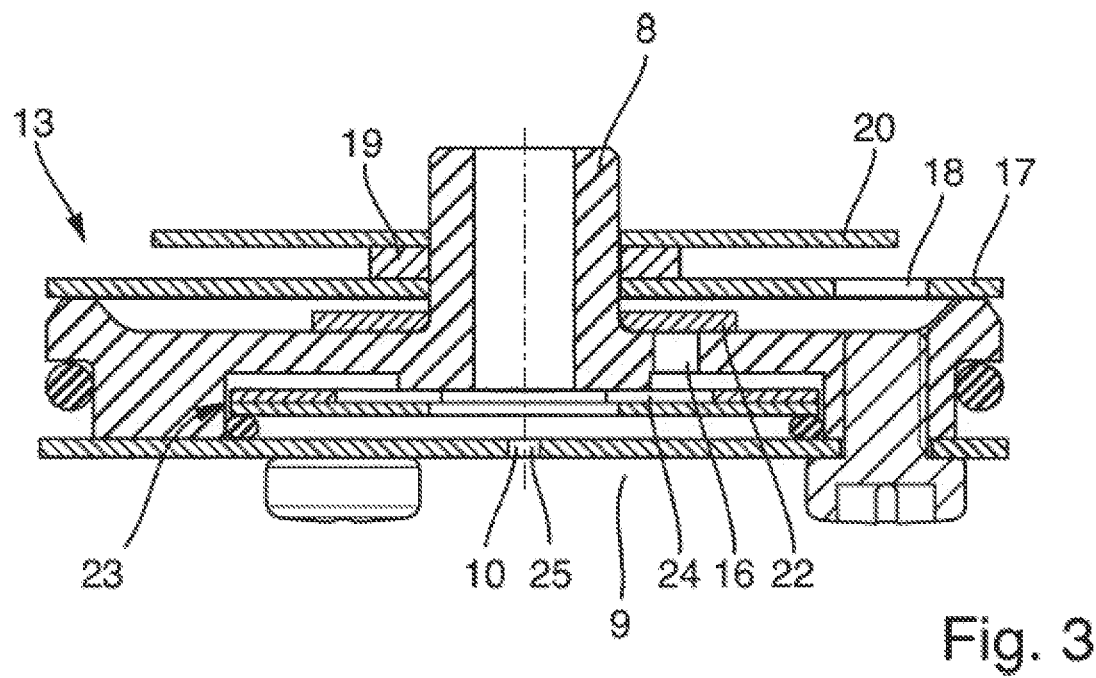
FIG. 3 is a longitudinal sectional view, in the region of the damping module, through a control piston and a first disk valve assembly according to a further embodiment of the damping module.

FIG. 3 illustrates a longitudinal section, in the region of the damping module 7, through the control piston 8 and the first disk valve assembly 13 as per a further embodiment of the damping module 7 of the invention. The first disk valve assembly 13 additionally comprises a bypass spacer disk 22. By contrast to FIG. 1 and/or FIG. 2, the control piston 8 comprises the at least one bypass inlet opening 16. The bypass spacer disk 22 is arranged downstream of the bypass disk 17, in the direction of the outer side of the first disk valve assembly 13, movably between the bypass disk 17 and the control piston 8. Furthermore, the bypass spacer disk 22 at least does not completely cover the bypass disk opening 18 of the bypass disk 17. Furthermore, on that side of the control piston 8 which faces toward the pressure chamber 9, a further disk valve assembly 23 is arranged on the control piston 8. The further disk valve assembly 23 comprises a throughflow opening 24 to the at least one bypass inlet opening 16. In the embodiment illustrated, the inlet 10 also functions as an outlet 25.

Figure 4:
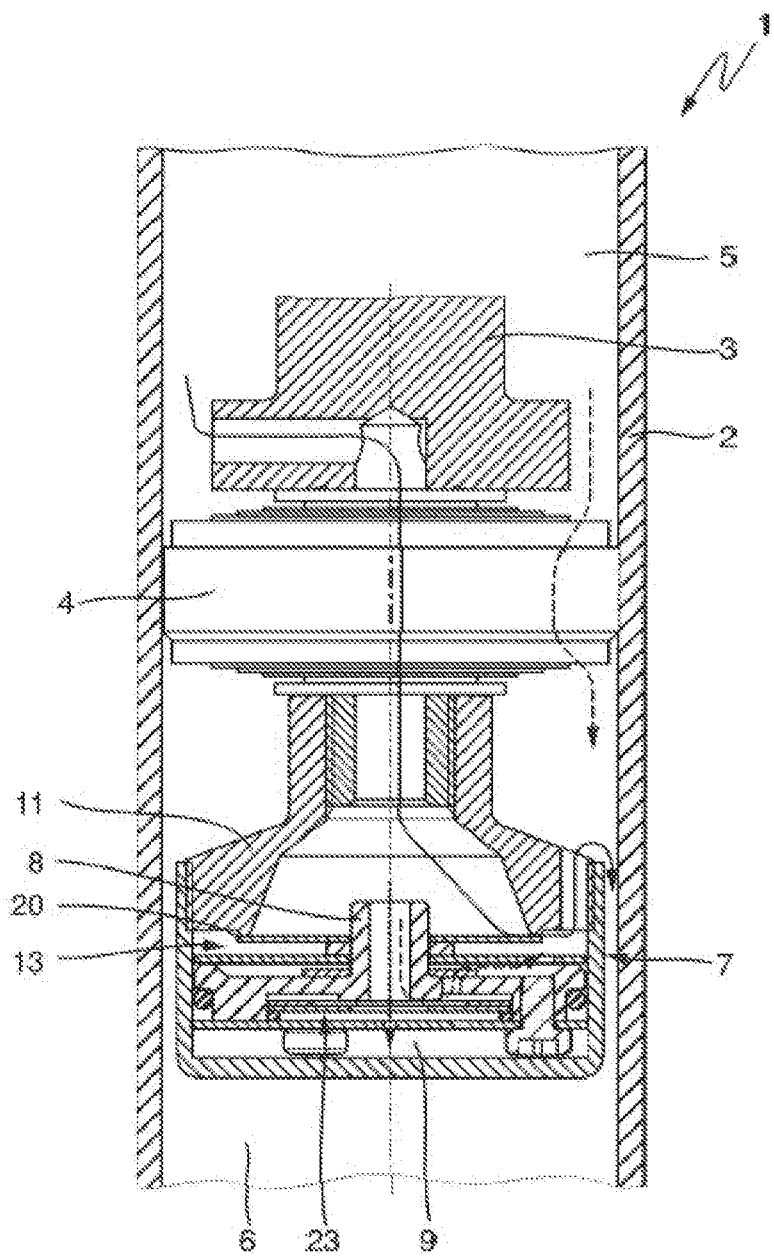
FIG. 4 is a longitudinal sectional view of another example vibration damper, in a region of a working piston similar to FIG. 1 and in a region of a damping module similar to FIG. 3.

FIG. 4 illustrates a longitudinal section, in the region of the working piston as per FIG. 1 and in the region of the damping module as per FIG. 3, according to a further embodiment of the invention. The possible flow through the working piston 4 is illustrated by means of a dashed flow arrow with long dashes, and is referred to as main path. The main path produces a fluidic connection, via the working piston 4, between the piston-rod-side working space 5 and the piston-rod-remote working space 6. A further fluidic connection leads past the working piston 4 and is illustrated, as a comfort path, with a solid flow arrow. The comfort path produces a fluidic connection, through the piston rod 3, between the piston-rod-side working space 5 and the piston-rod-remote working space 6. The comfort path emerges into the piston-rod-remote working space 6 by virtue of the comfort disk 20 lifting off from the comfort valve support edge 14. As a further fluidic flow path, a control path is illustrated by means of a dotted flow arrow. The control path leads via the inlet 10 of the control piston 8 into the pressure chamber 9. The fluidic flow of the control path controls the position of the control piston 8 within the damping module 7 and influences the action of force on the comfort disk 20 of the first disk valve assembly 13, wherein the comfort disk 20 either lies on the comfort valve support edge 14 or opens up the latter for the throughflow of the comfort path into the piston-rod-remote working space 6. As a further fluidic flow path, a bypass control path is illustrated by means of a dashed flow arrow with short dashes, and is referred to as control bypass path. The control bypass path circumvents the valve between the comfort disk 20 and the comfort valve support edge 14, and constitutes a fluidic connection between the piston-rod-side working space 5 and the piston-rod-remote working space 6. A means of controlling the control bypass flow can be realized by means of the illustrated second disk valve assembly 23 and/or the movement of the control piston 8.

INDUSTRIAL APPLICABILITY

Vibration dampers for vehicles of the above-described type are used in the production of vehicles, in particular of chassis of motor vehicles.

LIST OF REFERENCE DESIGNATIONS

1=Vibration damper
2=Damper tube
3=Piston rod
4=Working piston
5=Piston-rod-side working space
6=Piston-rod-remote working space
7=Damping module
8=Control piston
9=Pressure chamber
10=Inlet
11=Housing cover
12=Housing pot
13=First disk valve assembly
14=Comfort valve support edge
15=Control piston support edge
16=Bypass inlet opening
17=Bypass disk
18=Bypass disk opening
19=Spacer disk
20=Comfort disk
21=Check valve
22=Bypass spacer disk
23=Further disk valve assembly
24=Throughflow opening
25=Outlet
- - - - ▶ =Main path
──────▶ =Comfort path
·········▶ =Control path
- - - - ▶ =Control bypass path

What is claimed is:

1. A vibration damper, comprising:
   a damper tube with an interior space at least partially filled with damping fluid;
   a piston rod movably disposed in the damper tube;
   a working piston attached to and movable jointly with the piston rod, wherein the working piston divides the interior space into a piston-rod-side working space and a piston-rod-remote working space;
   a damping module configured for frequency-dependent control of a comfort bypass formed between the piston-rod-side working space and the piston-rod-remote working space and which includes a comfort path configured to permit flow of the damping fluid in parallel with respect to flow through the working piston,
   a control piston which is received in the damping module and configured to perform stroke movements and which, remote from the piston rod, delimits a pressure chamber arranged in the damping module, wherein the pressure chamber comprises at least one inlet,
   wherein the damping module comprises a damping module housing comprising:
      a housing cover and a housing pot attached to the housing cover and arranged remote from the piston rod,
      wherein the damping module housing comprises the control piston and a first disk valve assembly,
      wherein the first disk valve assembly comprises a bypass disk, a comfort disk, and a spacer disk positioned between the bypass disk and the comfort disk, wherein the first disk valve assembly additionally comprises a bypass spacer disk, wherein the bypass spacer disk is arranged, downstream of the bypass disk in a direction of an outer side of the first disk valve assembly, movably between the bypass disk and the control piston,
      wherein, via the bypass disk bypassing the comfort disk, damping fluid can be caused to flow via a bypass control path hydraulically in parallel with respect to the flow through the working piston, wherein operation of the bypass disk is regulated by the position of the control piston,
      wherein the control piston comprises a bypass inlet opening, and
      wherein the bypass spacer disk configured to cover the bypass inlet opening and not completely cover a bypass disk opening of the bypass disk of the first disk valve assembly.

2. The vibration damper of claim 1, wherein the pressure chamber comprises an outlet, wherein the outlet is also the inlet into the pressure chamber, wherein the outlet opens, upstream, into a side of the first disk valve assembly that faces toward the piston-rod-side working space.

3. The vibration damper of claim 1, wherein the pressure chamber comprises an outlet arranged on the housing pot, wherein the outlet opens into the piston-rod remote working space.

4. The vibration damper of claim 1, wherein the housing cover, to form the comfort valve with the first disk valve assembly, comprises at least one comfort valve support edge as a valve seat.

5. The vibration damper of claim 1, wherein the control piston comprises at least one control piston support edge arranged at an edge thereof, wherein the bypass disk lies on the at least one control piston support edge.

6. The vibration damper of claim 1, wherein the damping module comprises a check valve arranged at the inlet of the pressure chamber.

7. The vibration damper of claim 5, wherein the bypass disk lies on the control piston support edge in a preloaded state.

8. The vibration damper of claim 1, wherein in the pressure chamber a further disk valve assembly is arranged on the control piston, wherein the further disk valve assembly comprises a throughflow opening to the bypass inlet opening.

* * * * *